P. J. CHURNSIDE.
VALVE GRINDING TOOL.
APPLICATION FILED JUNE 9, 1919.
1,371,967.
Patented Mar. 15, 1921.
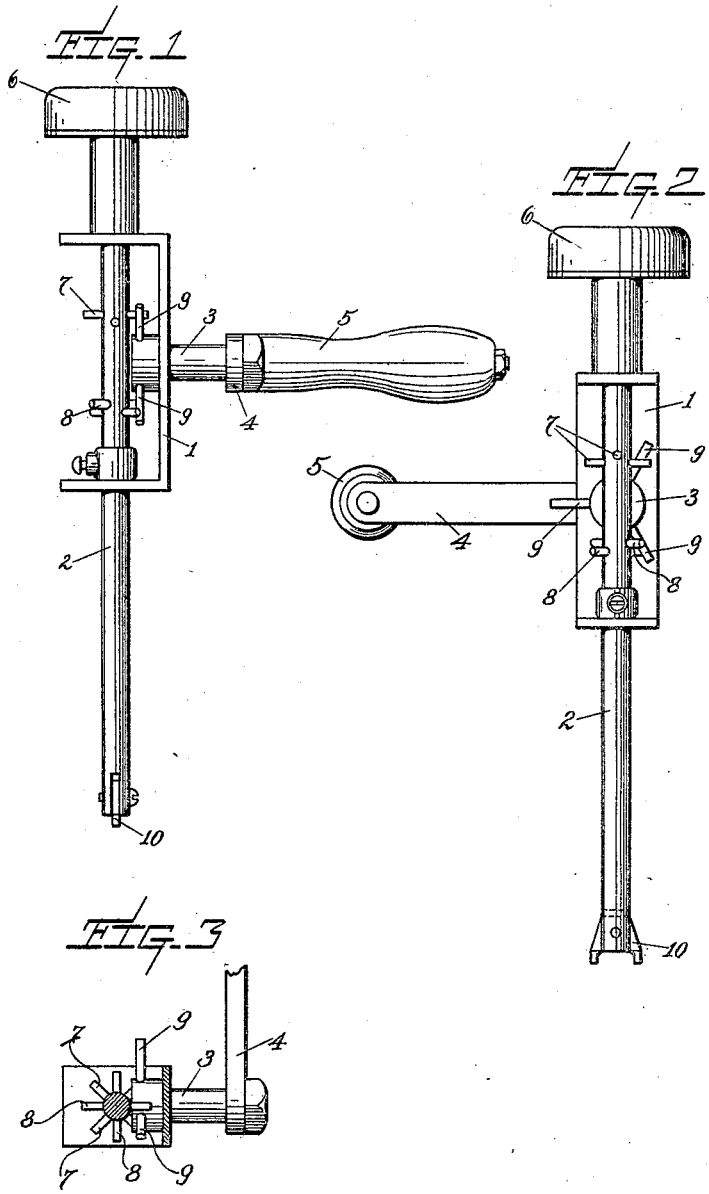
INVENTOR.
Phillip John Churnside
BY
ATTORNEY.

UNITED STATES PATENT OFFICE.

PHILLIP JOHN CHURNSIDE, OF HUDSON, PENNSYLVANIA.

VALVE-GRINDING TOOL.

1,371,967.  Specification of Letters Patent.  Patented Mar. 15, 1921.

Application filed June 9, 1919. Serial No. 302,850.

*To all whom it may concern:*

Be it known that I, PHILLIP JOHN CHURNSIDE, a citizen of the United States of America, and resident of Hudson, in the county of Luzerne and State of Pennsylvania, have invented a certain new and useful Valve-Grinding Tool, of which the following is a specification.

My invention relates to means for grinding valves to their seats, and like mechanical operations, and comprises an instrument particularly intended for grinding in the puppet valves of gasoline engines and the like. In this operation, it is desirable that the valve should be oscillated back and forth, with, occasionally, an advance of the valve as will change the locus of the range of oscillation of the valve. My invention consists in novel and simple means whereby, by the continuous forward rotation of a crank, such oscillatory motion may be given to a valve and whereby, by proper and simple manipulation of such crank, the desired shifting of locus of the oscillation may be effected.

The objects of my invention are, to provide an improved, simple and effective valve grinding tool, adapted for giving the desired oscillatory motion to a valve, and to provide simply and effectively for the shifting of the locus of oscillation.

I will now proceed to describe my invention with reference to the accompanying drawings, in which one form of tool embodying my invention is illustrated, and will then point out the novel features in claims. In the said drawings:

Figure 1 shows a side elevation of the improved valve grinding tool; Fig. 2 shows a front elevation thereof, and Fig. 3 a transverse section thereof.

In the drawings, 1 designates a frame, provided with bearings in which a shaft 2 is rotatably mounted, and with another bearing in which a driving shaft 3 is mounted at right angles to shaft 2. Upon shaft 3 there is a crank arm 4 provided with a handle 5 by means of which shaft 3 may be rotated. At its upper end, shaft 2 is provided with a swiveled head 6 by which the tool may be steadied and, if desired, slight pressure applied, while it is in use.

On shaft 2 there are two rows of gear teeth 7 and 8, one above and the other below the shaft 3, and on shaft 3 there is a row of gear teeth 9, the arrangement being such that, during continuous rotation of the crank 5, alternately one of teeth 9 will engage one of teeth 7, and then one of teeth 9 will engage one of teeth 8, so imparting to shaft 2 an oscillatory motion the locus of which remains fixed. In the particular construction shown, these gear teeth are all projecting pins; but this apparently crude form of gear tooth, providing, as it does, considerable back-lash, has for that very reason a distinct advantage, as will be pointed out hereafter. In the particular construction shown, the tool is proportioned for desired angle of oscillation, by providing four teeth in each of rows 7 and 8, and three teeth in row 9; rows 7 and 8 being staggered relatively; but this relation may be varied; the important thing being that by the rotation of crank 5 a tooth 9 is caused to engage and move a tooth 7, and then, after engagement between such teeth has ceased, a tooth 9 is caused to engage and move a tooth 8, so imparting an oscillatory motion to shaft 2.

When it is desired to change the locus of the oscillation thus produced, the crank arm 5 is rotated backward for a turn or two. Owing to the backlash existing between the rows of gear teeth 7 and 8, on the one hand, and 9, on the other hand, the effect of this backward rotation is to cause teeth 9 to slip past the two teeth of series 7 and 8 which previously they have been engaging alternately, and to engage instead other teeth of those two rows; in other words, by this slipping of the gear teeth, the shaft 2 is shifted beyond the range of the previous oscillation, so changing, as desired, the locus of the oscillation. Such locus having been so changed by a momentary backward rotation of the crank, the previous forward rotation is resumed; or, if desired, the backward rotation is continued, and after a time, when further shifting of the locus is desired, the backward rotation is stopped and forward rotation continued; the fact being that during continued rotation of crank arm 5 in one direction, oscillation of shaft 2 occurs without shifting of the locus; that when direction of rotation of crank arm 5 is reversed, slipping of the gears occurs with consequent shifting of the locus of oscillation; and it does not matter which direction of rotation be considered forward, and which backward, shifting of the locus occurs when direction of rotation is changed from either direction to the other.

Valves such as those with which my tool is intended to be used are customarily provided either with a key slot or spanner holes for engagement of the valve by a grinding tool. Shaft 2 is provided at its lower end with a reversible bit 10, adapted at one end for engagement with spanner holes, and at the other end for engagement with a key slot.

What I claim is:—

1. Means for converting continuous rotary motion into oscillatory motion, comprising two shafts, arranged at an angle one to the other, and supporting bearings therefor, the one shaft having two sets of gear teeth on opposite sides respectively of the other said shaft, such other shaft having means adapted to engage and oscillate said two sets of gear teeth alternately, there being backlash between said two sets of gear teeth, on the one hand, and the engaging means therefor on the continuously rotating shaft, such that reversal of direction of rotation of the continuously rotating shaft causes the engaging means thereon to slip past the gear teeth with which it was previously engaged into engagement with other gear teeth.

2. Means for converting continuous rotary motion into oscillatory motion, comprising two shafts, arranged at an angle one to the other, and supporting bearings therefor, driving means on one said shaft, which shaft is arranged to be rotated continuously in one direction with reversal of direction at will, and driven means on the other said shaft and arranged on opposite sides of said continuously rotating shaft and to be engaged alternately by the driving means thereon, with backlash between the driving and driven means such that reversal of direction of rotation of the driving shaft causes shifting of the locus of oscillation of the driven shaft.

3. An instrument such as described, comprising in combination a driving shaft, a driven shaft, bearings therefor, and means for transmitting motion from one to the other comprising means for transforming continuous rotary motion of the driving shaft into oscillatory motion of the other and for shifting the locus of oscillation upon reversal of direction of motion of the driving shaft.

4. An instrument such as described, comprising in combination a driving shaft, a driven shaft, bearings therefor, two rows of projecting pins on the driven shaft located respectively on opposite sides of the driving shaft, and pins on the driving shaft arranged to engage alternately pins of opposite rows of the driven shaft, there being backlash between the pins of the driving shaft, on the one hand, and the pins of the driven shaft, on the other hand, such that reversal of direction of rotation of the driving shaft causes slipping of pins thereon from engagement with the previously-engaged pins of the driven shaft to engagement with other pins thereof.

In testimony whereof I have signed this specification in the presence of two subscribing witnesses.

PHILLIP JOHN CHURNSIDE.

Witnesses:
  MARTIN BOHINSKI,
  J. R. BARR.